US009008855B2

(12) United States Patent
Ishikawa

(10) Patent No.: US 9,008,855 B2
(45) Date of Patent: Apr. 14, 2015

(54) METHOD FOR CLOCKING CUMULATIVE OPERATING TIME FOR A CARGO-HANDLING VEHICLE, AND THE CARGO-HANDLING VEHICLE BY USE OF THE METHOD

(75) Inventor: Naoki Ishikawa, Sagamihara (JP)

(73) Assignee: Mitsubishi Nichiyu Forklift Co., Ltd., Kyoto (JP)

( * ) Notice: Subject to any disclaimer, the term of this patent is extended or adjusted under 35 U.S.C. 154(b) by 425 days.

(21) Appl. No.: 13/619,786

(22) Filed: Sep. 14, 2012

(65) Prior Publication Data

US 2013/0073117 A1 Mar. 21, 2013

Related U.S. Application Data

(62) Division of application No. 12/746,067, filed as application No. PCT/JP2009/061801 on Jun. 23, 2009, now Pat. No. 8,392,059.

(30) Foreign Application Priority Data

Jul. 10, 2008 (JP) ................................ 2008-180822

(51) Int. Cl.
*G05D 1/00* (2006.01)
*G05D 3/00* (2006.01)
*G06F 7/00* (2006.01)
*G06F 17/00* (2006.01)
(Continued)

(52) U.S. Cl.
CPC ........................................ *G07C 5/04* (2013.01)

(58) Field of Classification Search
USPC ........................................................ 701/1
See application file for complete search history.

(56) References Cited

U.S. PATENT DOCUMENTS 5,065,320 A * 11/1991 Hayashi et al. .................. 701/1
7,050,893 B2 * 5/2006 Watanabe et al. ............ 701/29.3
7,713,163 B2 * 5/2010 Hayashi et al. .................. 477/3
(Continued)

FOREIGN PATENT DOCUMENTS

JP 5-17728 Y2 5/1993
JP 6-333166 A 12/1994
(Continued)

OTHER PUBLICATIONS

European Search Report dated Aug. 26, 2013 issued in corresopnding European Application No. 09794339.

*Primary Examiner* — Ariel Yu
(74) *Attorney, Agent, or Firm* — Birch, Stewart, Kolasch & Birch, LLP

(57) ABSTRACT

An accumulated use time for cargo handling vehicles is accurately displayed by a time measuring device even if the time measuring device fails and is replaced. Units such as a display unit and a control unit of the cargo handling vehicle each include a time measuring device and a storage device. The device may perform in a synchronization mode in which the difference between the accumulated use times of both devices is made the same and a synchronization inhibition mode in which the accumulated use times are not changed. The accumulated use times are communicated between the function units, and the accumulated use time of the cargo handling vehicle and the absolute value of the difference between the accumulated use times of both measuring devices are taken into consideration. The appropriate mode is selected and the time measurement is carried out in the selected mode.

2 Claims, 5 Drawing Sheets

(51) Int. Cl.
*G06G 7/48* (2006.01)
*G07C 5/04* (2006.01)

(56) References Cited

U.S. PATENT DOCUMENTS

| | | | | |
|---|---|---|---|---|
| 7,953,559 | B2 * | 5/2011 | Sundermeyer et al. | 702/33 |
| 2004/0148083 | A1 * | 7/2004 | Arakawa et al. | 701/50 |
| 2008/0164972 | A1 * | 7/2008 | Taki et al. | 340/3.1 |
| 2008/0195365 | A1 * | 8/2008 | Ohkura et al. | 703/8 |
| 2008/0218382 | A1 * | 9/2008 | Kavaler | 340/933 |

FOREIGN PATENT DOCUMENTS

| | | | |
|---|---|---|---|
| JP | 2005-76618 | A | 3/2005 |
| JP | 2007-3468 | A | 1/2007 |
| JP | 2007-64151 | A | 3/2007 |
| JP | 2008-40568 | A | 2/2008 |
| JP | 2008-139935 | A | 6/2008 |

* cited by examiner

METHOD FOR CLOCKING CUMULATIVE OPERATING TIME FOR A CARGO-HANDLING VEHICLE, AND THE CARGO-HANDLING VEHICLE BY USE OF THE METHOD

CROSS REFERENCE TO RELATED APPLICATIONS

This application is a Divisional of copending application Ser. No. 12/746,067 filed on Jan. 10, 2011, now U.S. Pat. No. 8,392,059 which is a National Phase of PCT International Application No. PCT/JP2009/061801 filed on Jun. 23, 2009, which claims the benefit to Patent Application No. 2008-180822 filed in Japan, on Jul. 10, 2008. The entire contents of all of the above applications is hereby incorporated by reference.

BACKGROUND OF THE INVENTION

1. Field of the Invention

The present invention relates to a method for clocking cumulative operating time for a cargo-handling vehicle, and the cargo-handling vehicle by use of the method.

The present invention particularly relates to the cargo-handling vehicle in which the total cumulative operating time thereof is always clocked by a clocking device on the side of the display unit (display and counter unit) of the vehicle after the shipment from the factory of the vehicle, thereby the correct total cumulative operating time can be always conserved, even when the display unit becomes out of order and is replaced by new unit.

2. Background of the Invention

A cargo-handling vehicle such as a forklift, a bulldozer, or a crane truck is used not for driving but for cargo handling in a specific area;

different from general passenger cars, the present worth of a cargo-handling vehicle depends chiefly on the cumulative operating time thereof (not on the integrating travel distance). Therefore, the cargo-handling vehicle is provided with a clocking device for clocking the cumulative operating time after the factory shipment of the vehicle. On the other hand, a passenger car is provided with an integrating travel distance meter (an odometer) for indicating how far the car has traveled since the factory shipment; in a case where the odometer become out of order and is replaced by new one, the cumulative operating time till the time point of the replacement has to be filled in the vehicle inspection certificate according to corresponding rules or regulations.

In former days, the clocking device for a cargo-handling vehicle was occasionally provided independently of a display unit for displaying the cumulative operating time; in recent times, the clocking device is often integral with the display unit. Further, the display unit itself is nowadays often treated as an assembly so that various types of data can be displayed by use of a control device with CPU and a display device with CPU, or error information and alarm information can be displayed by use of a light emitting device, for example, with LED (light emitting diodes). Contrivances are incorporated in the clocking device so that the data of the cumulative operating time in the clocking device cannot be revised after the factory shipment of the vehicle; however, in a case where the display unit is made as an assembly, the whole display unit has to be replaced by new one even when only one of the light emitting diodes becomes out order; thereby, because of the replacement with a new display unit, a problem is caused that the data as to the cumulative operating time is reset and the correct data is lost.

Further, in general, the clocking device as described above integrates the operating time while the power source for the vehicle is put under an ON-state; and, the time integration also proceeds during the adjustment before the factory shipment; therefore, the data as to the cumulative operating time is reset to zero just before the factory shipment. It is noted that resetting the data to zero is often called "0-rest" hereafter in this specification.

If the 0-reset can be performed by a user of the vehicle, there arises an apprehension that the data as to the cumulative operating time may be falsified so that it looks as if an actually long time span of a used vehicle had been a short time span. Therefore, it is a rule that the data of the cumulative operating time cannot be changed after the factory shipment of the vehicle.

In relation to the clocking device as described above, the patent reference 1 (JP2008-040568) discloses a vehicle control device by which the data regarding to the cumulative operating time cannot be altered after the factory shipment of the vehicle; thereby, the cumulative operating time is stored in a nonvolatile memory; the data (values) stored in the clocking device are made changeable by means of a tool on an external side of the clocking device (or the vehicle); the data (values) in the clocking device can be changed only when the cargo-handling vehicle is a new-vehicle; and, whether or not the vehicle is a new-vehicle is judged according to whether the cumulative operating time is zero or near zero.

According to the disclosure of the patent reference 1, the falsification of the data records after factory shipment may be prevented; however, the patent reference gives neither disclosure nor suggestion regarding how to cope with the situation in which the record of the cumulative operating time is reset to zero and becomes missing, in a case where the display device comprising the hour meter becomes out of order and has to be replaced by new one.

Further, besides the display unit as described above, a cargo-handling vehicle is provided with a plurality of functional units such as a control unit provided with a CPU performing the control over the whole cargo-handling vehicle. In a case where a user owns a plurality of the cargo-handling vehicles of the same type, one of the vehicles may sometimes go out of order; for instance, the user may experience a trouble regarding a loading/unloading function (the lift lever function) or regarding a mast inclination function (the tilt lever function). In such a trouble, the user or a service engineer practically replaces a functional unit such as the control unit for controlling the whole cargo-handling vehicle that has gone out of order, by the corresponding functional unit out of one of the other cargo-handling vehicles that are normally operated, so as to identify (isolate) the cause of the trouble, namely, so as to confine the functional unit causing the trouble. Thereby, if the malfunction is resolved by the (unit) replacement, it can be judged that the functional unit (in the disordered vehicle) before the replacement has been out of order and includes an element causing the malfunction. And, if the malfunction is not resolved by the (unit) replacement, it can be judged that the functional unit before the replacement has been under normal conditions; thus, the troubleshooting will be performed for another functional unit. In any way, after the functional unit causing the trouble is identified (isolated), the disordered functional unit is returned to the disordered cargo-handling vehicle, while the normal functional unit is returned to the normal cargo-handling vehicle; and, the vehicle with the disordered functional unit is placed under maintenance so as to repair the element causing the malfunction in the unit.

The manner of identifying the cause of a trouble by exchanging the functional units of a same type sometimes is applied to not only a well-used cargo-handling vehicle but also a relatively new cargo-handling vehicle, for instance, a cargo-handling vehicle that is placed in a showroom and encounters defective conditions due to the test rides of customers.

In view of the above-described difficulties to deal with, the subject of the present invention is to provide a method for clocking cumulative operating time for a cargo-handling vehicle and the cargo-handling vehicle by use of the method, whereby the cumulative operating time is correctly and reliably conserved under a condition that the cumulative operating time is succeeded from a functional unit to a functional unit, in a case where:

(1) a functional unit incorporated with a clocking device becomes out of order and is replaced by new one; or (2) the functional unit incorporated with a clocking device is exchanged by an alternative functional unit so as to identify the cause of a malfunction and is returned back in-situ (to the original position of the functional unit).

Further, the present invention aims at providing the method and the cargo-handling vehicle, whereby (3) the data regarding the cumulative operating time can be reset to zero at the factory shipment of the vehicle, whereas the data is prevented from being falsified after the factory shipment.

REFERENCES

PATENT REFERENCE 1: JP2008-040568

DISCLOSURE OF THE INVENTION

In order to reach the goal of the above subject, the present invention discloses a method for clocking cumulative operating time for a cargo-handling vehicle provided with a plurality of functional units, the functional units comprising at least a first functional unit and a second functional unit; whereby, each of the first functional unit having a first clocking device and the second functional unit having a second clocking device clocks the cumulative operating time of the cargo-handling vehicle, by use of each clocking device;

the data information regarding the clocked cumulative operating time is stored in a memory device provided in each functional unit the data information regarding cumulative operating time stored in each functional unit transmitted toward the other functional units, and the data regarding cumulative operating time over all the functional units are mutually transmitted one another at a predetermined time interval, through a communication port provided in each functional unit for sending and receiving the data information;

the differences among the data regarding the cumulative operating time over all the functional units are estimated so that the greatest cumulative operating time and the unit corresponding to the greatest cumulative operating time over all the functional units are identified;

each of the functional units selects either of a synchronous mode under which the data regarding the greatest cumulative operating time stored in the functional unit corresponding to the greatest cumulative operating time is overwritten on the data regarding cumulative operating time stored in the remaining functional units so that all the differences among the data regarding cumulative operating time over all the functional units are cancelled, or a synchronization prohibition mode under which the process execution under the synchronous mode is prohibited.

Further, the present invention discloses a cargo-handling vehicle provided with a plurality of functional units, the functional units comprising at least a first functional unit and a second functional unit; whereby, each of the first functional unit having a first clocking device and the second functional unit having a second clocking device clocks the cumulative operating time of the cargo-handling vehicle, by use of each clocking device;

each functional unit is provided with a memory device for storing the data regarding the cumulative operating time clocked in the functional unit;

each functional unit is provided with a communication port for sending and receiving the data regarding cumulative operating time stored in the functional unit, and the data regarding cumulative operating time over all the functional units being mutually transmitted one another through the communication ports, the differences among the data regarding the cumulative operating time over all the functional units are estimated so that the greatest cumulative operating time and the unit corresponding to the greatest cumulative operating time over all the functional units are identified; by use of a control device provided in each functional unit, each of the functional units selects either of a synchronous mode under which the data regarding the greatest cumulative operating time stored in the functional unit corresponding to the greatest cumulative operating time is overwritten on the data regarding cumulative operating time stored in the remaining functional units so that all the differences among the data regarding cumulative operating time over all the functional units are cancelled, or a synchronization prohibition mode under which the process execution under the synchronous mode is prohibited.

Further, an embodiment as the above method invention is the method for clocking cumulative operating time for a cargo-handling vehicle, whereby each functional unit is placed under the synchronous mode in a case where the maximum value among the data regarding the cumulative operating time over all the functional units is less than or equal to a predetermined T, whereas each functional unit is placed under the synchronization prohibition mode in a case where the maximum value is greater than the predetermined time T.

In response to this method embodiment, an embodiment as the above machine (apparatus) invention is the cargo-handling vehicle, whereby each functional unit is placed under the synchronous mode in a case where the maximum value among the data regarding the cumulative operating time over all the functional units is less than or equal to a predetermined T, whereas each functional unit is placed under the synchronization prohibition mode in a case where the maximum value is greater than the predetermined time T.

Another embodiment as the above method invention is the method for clocking cumulative operating time for a cargo-handling vehicle, whereby an alarm message is issued from at least one functional unit, under the synchronization prohibition mode.

In response to this method embodiment, another embodiment as the above machine (apparatus) invention is the cargo-handling vehicle, whereby an alarm message is issued from at least one functional unit, under the synchronization prohibition mode.

In order to solve the subjects, the present invention further discloses a method for clocking cumulative operating time for a cargo-handling vehicle provided with a plurality of functional units, the functional units comprising at least a first functional unit and a second functional unit; whereby, each of the first functional unit having a first clocking device and the second functional unit having a second clocking device clocks the cumulative operating time of the cargo-handling vehicle, by use of each clocking device;

the data information regarding the clocked cumulative operating time is stored in a memory device provided in each functional unit;

the data information regarding cumulative operating time stored in each functional unit transmitted toward the other functional units, and the data regarding cumulative operating time over all the functional units are mutually transmitted one another at a predetermined time interval, through a communication port provided in each functional unit for sending and receiving the data information;

the differences among the data regarding the cumulative operating time over all the functional units are estimated so that the greatest cumulative operating time and the unit corresponding to the greatest cumulative operating time over all the functional units are identified, in a manner that the relative differences are estimated on a condition that a reference cumulative operating time in a reference functional unit is predetermined;

each of the functional units selects either of a synchronous mode under which the data regarding the greatest cumulative operating time stored in the functional unit corresponding to the greatest cumulative operating time is overwritten on the data regarding cumulative operating time stored in the remaining functional units so that all the differences among the data regarding cumulative operating time over all the functional units are cancelled, or a synchronization prohibition mode under which the process execution under the synchronous mode is prohibited.

In order to solve the subjects (in response to the above method invention), the present invention further discloses a cargo-handling vehicle provided with a plurality of functional units, the functional units comprising at least a first functional unit and a second functional unit; whereby, each of the first functional unit having a first clocking device and the second functional unit having a second clocking device clocks the cumulative operating time of the cargo-handling vehicle, by use of each clocking device;

each functional unit is provided with a memory device for storing the data regarding the cumulative operating time clocked in the functional unit;

each functional unit is provided with a communication port for sending and receiving the data regarding cumulative operating time stored in the functional unit, and the data regarding cumulative operating time over all the functional units being mutually transmitted one another through the communication ports, the differences among the data regarding the cumulative operating time over all the functional units are estimated so that the greatest cumulative operating time and the unit corresponding to the greatest cumulative operating time over all the functional units are identified, in a manner that the relative differences are estimated on a condition that a reference cumulative operating time in a reference functional unit is predetermined; by use of a control device provided in each functional unit, each of the functional units selects either of a synchronous mode under which the data regarding the greatest cumulative operating time stored in the functional unit corresponding to the greatest cumulative operating time is overwritten on the data regarding cumulative operating time stored in the remaining functional units so that all the differences among the data regarding cumulative operating time over all the functional units are cancelled, or a synchronization prohibition mode under which the process execution under the synchronous mode is prohibited.

Another embodiment as the above method invention is the method for clocking cumulative operating time for a cargo-handling vehicle, whereby each functional unit is placed under the synchronization prohibition mode in a case where the maximum value among the data regarding the cumulative operating time over all the functional units is less than or equal to a predetermined time t; each functional unit is placed under the synchronous mode in a case where the maximum value is greater than the predetermined time t and less than or equal to a predetermined time T; and, each functional unit is placed under the synchronization prohibition mode under which an alarm message is issued from any one of the functional units, in a case where the maximum value is greater than the predetermined time t and the predetermined time T.

In response to this method embodiment, another embodiment as the above machine (apparatus) invention is the cargo-handling vehicle, whereby each functional unit is placed under the synchronization prohibition mode in a case where the maximum value among the data regarding the cumulative operating time over all the functional units is less than or equal to a predetermined time t; each functional unit is placed under the synchronous mode in a case where the maximum value is greater than the predetermined time t and less than or equal to a predetermined time T; and, each functional unit is placed under the synchronization prohibition mode under which an alarm message is issued from any one of the functional units, in a case where the maximum value is greater than the predetermined time t and the predetermined time T.

Another embodiment as the above method invention is the method for clocking cumulative operating time for a cargo-handling vehicle, whereby the synchronization prohibition mode is cancelled and the differences among the data regarding the cumulative operating time are cancelled, in a case where any one of the functional units receives an order as to the cancellation of the synchronization prohibition mode as well as the differences.

In response to this method embodiment, another embodiment as the above machine (apparatus) invention is the cargo-handling vehicle, whereby the synchronization prohibition mode is cancelled and the differences among the data regarding the cumulative operating time are cancelled, via an external service tool, which the alarming message is being issued, in a case where any one of the functional units receives an order as to the cancellation of the synchronization prohibition mode as well as the differences.

Another embodiment as the above method invention is the method for clocking cumulative operating time for a cargo-handling vehicle, the memory device in each functional unit comprising a non-volatile memory, whereby the data regarding the cumulative operating time is overwritten on the non-volatile memory, when the power source of the vehicle is placed under an OFF-state at predetermined, or every time when predetermined time intervals pass.

In response to this method embodiment, another embodiment as the above machine (apparatus) invention is the cargo-handling vehicle, the memory device in each functional unit comprising a non-volatile memory, whereby the data regarding the cumulative operating time is overwritten on the non-volatile memory, when the power source of the vehicle is placed under an OFF-state at predetermined, or every time when predetermined time intervals pass.

Another embodiment as the above method invention is the method for clocking cumulative operating time for a cargo-handling vehicle, whereby the data regarding the cumulative operating time clocked and stored in each functional unit is reset to zero as per the 0-reset order from an external service tool, and a 0-reset prohibition flag is established in each functional unit.

In response to this method embodiment, another embodiment as the above machine (apparatus) invention is the cargo-handling vehicle, each functional unit being provided with a function by which the data regarding the cumulative operating time clocked and stored in each functional unit is reset to zero as per the 0-reset order from an external service tool, and the 0-reset prohibition flag that prohibits the reset of the 0-reset is established in each functional unit.

According to the present invention, clocking of the cumulative operating time of the cargo-handling vehicle is performed by a plurality of functional units, and the data regarding the cumulative operating time clocked by each functional unit is stored in a memory device provided in the functional unit; further the data (hereby multiple data) stored in the functional units are sent to and received from mutually among the functional units at predetermined time intervals through a communication means (comprising a communication port and connections) in each functional unit. Further, in each functional unit, the data clocked and stored in one functional unit is compared with each data from other functional units; the differences between the data clocked and stored in one functional unit and the data from other functional units are computed; and the maximum cumulative operating time is (as well as the differences and the maximum difference are) identified at every time point as to the starting or ending points of any one of the predetermined time intervals. Each of the functional units selects either of a synchronous mode under which the data regarding the greatest cumulative operating time stored in the functional unit corresponding to the greatest cumulative operating time is overwritten on the data regarding cumulative operating time stored in the remaining functional units so that all the differences among the data regarding cumulative operating time over all the functional units are cancelled, or a synchronization prohibition mode under which the process execution under the synchronous mode is prohibited. Thus, each functional unit can select either of the synchronous mode and the synchronization prohibition mode so as to select an optimal mode in response to a case (a situation) under which the vehicle and the functional units are placed. In this way, a method for clocking cumulative operating time for a cargo-handling vehicle and the cargo-handling vehicle by use of the method can be provided, whereby the proper (authentic) cumulative operating time of the cargo-handling vehicle can be conserved accurately, reliably, and continuously in the vehicle.

The synchronous mode is selected, for instance, under a condition that the above-described maximum time difference is less than or equal to a predetermined time T (a predetermined threshold time), whereas the synchronization prohibition mode is selected under a condition that the maximum time difference is greater than the time T. Incidentally, the predetermined value T may be a value corresponding to a time lag between a time point where the clocked cumulative operating time is stored in the non-volatile memory and a time point where the power source of the vehicle is shut down; the predetermined value T may be a value corresponding to the difference among the accuracies of the clocking devices over the functional units; or the predetermined value T may be a value brought by a relatively trivial factor that does not cause a serious trouble. Thus, if the maximum difference among the data regarding the cumulative operating time in the functional units is smaller than or equal to a predetermined value T, then it is judged that each functional unit is free from a serious trouble suspending the functions of the functional unit. In addition, it is considered in view of cumulative operating time control that the greatest value among the data regarding the cumulative operating time over all the functional units is the most reliable value; therefore the greatest value is pasted on the data of smaller cumulative operating time in the other functional units. Accordingly, in the synchronous mode, the most reliable data regarding the cumulative operating time in a functional unit, as a proper value, can be automatically pasted on the data regarding the cumulative operating time in the other functional units, in a case where the difference among the data regarding the cumulative operating time over the functional units is generated by a factor that is unrelated to a serious trouble.

On the other hand, the synchronization prohibition mode is related to the cases of serious potential troubles. As described in the end part of "Background of the Invention," the cases are:

(Case 1 where) a functional unit incorporated with a clocking device becomes out of order and is replaced by new one; and (Case 2 where) the functional unit incorporated with a clocking device is exchanged by an alternative functional unit so as to identify the cause of a malfunction and is returned back in-situ (to the original position of the functional unit).

In the above Case 1, even if a synchronous mode is adopted, there happens no problem; however, in Case 2, if a synchronous mode is adopted, a problem may happen whereby the cumulative operating time of a younger cargo-handling vehicle increases or the cumulative operating time of an elder (more used) cargo-handling vehicle decreases. Nevertheless, it is difficult to distinguish Case 1 from Case 2, simply on a reason that the time difference exceeds the value T; accordingly, when the time difference is greater than T, the synchronization prohibition mode may be adopted first of all; and, a service engineer may be involved a troubleshooting so as to determine how to solve the malfunction. Thus, a possible problem due to a careless synchronous mode adoption can be evaded; and, the proper cumulative operating time, or the reliability regarding the cumulative operating time can be conserved.

Moreover, an alarm may be issued so as to help the service engineer treat with the trouble in a case of the synchronization prohibition mode. Thus, the service engineer can judge the situation; and, he or she can returns back the functional units exchanged for the purpose of identifying the cause of the trouble to the original positions as to the functional units, with and without the synchronous mode in response to Case 1 and case 2 respectively. Thereby, the increase, if any, of the cumulative operating time during that situation (during the troubleshooting) is infinitesimal, and the time difference among the data regarding the cumulative operating time is eliminated by the synchronous mode; thus, a method for clocking cumulative operating time for a cargo-handling vehicle and the cargo-handling vehicle by use of the method can be provided, thereby the proper cumulative operating time, or the reliability regarding the cumulative operating time can be conserved, the cumulative operating time being succeeded in the vehicle.

In addition, in an embodiment in relation to Case 1 according to the present invention, an alarm is issued so as to help the service engineer treat with the trouble; and, any one of the functional units can eliminate the time difference among the data regarding the cumulative operating time over the functional units by canceling the synchronous prohibition mode, based on the order of the cancellation as to the mode, from the external service tool; in this way, a method for clocking cumulative operating time for a cargo-handling vehicle and the cargo-handling vehicle by use of the method can be provided, thereby the proper cumulative operating time, or the reliability regarding the cumulative operating time can be always conserved, the cumulative operating time being succeeded in the vehicle.

Further, in another embodiment according to the present invention, besides the above described synchronization prohibition mode with an alarm message (to help the service engineer treat with the trouble), a synchronous prohibition mode without an alarm message can be provided. This embodiment is considered for some users who own the cargo-handling vehicles that have not been used like new-vehicles and do not prefer the automatic pasting of the data regarding the cumulative operating time; and, the synchronous prohibition mode without an alarm message is a process mode in which the activation of the synchronous mode is limited until the cumulative operating time stored in a functional unit that is selected in advance exceeds a predetermined time t.

Accordingly, besides the difference threshold T as to the maximum difference among the data regarding the cumulative time over the functional units, a threshold (a time factor) t is incorporated in the selection condition as to the synchronous mode and the synchronization prohibition mode; for instance, the threshold (time factor) t may be set at such a level that a used cargo-handling vehicle is regarded as a new-vehicle if the cumulative operating time of the used cargo-handling vehicle is within the level. In this way, the synchronization prohibition mode without an alarm message is realized whereby neither emergency (repair) measure nor synchronization among the data regarding the cumulative operating time is needed, under a condition that the maximum difference among the data over the functional units is smaller than the threshold T as well as the cumulative operating time of the vehicle is less than the threshold t. Thus, the method and the vehicle according the present invention can deal with the needs of users.

Further, in the cargo-handling vehicle according to the present invention, in response to a request as to the cumulative time reset from the external service tool, the data regarding the cumulative time over the functional units are reset to zero, and the 0-reset prohibition flag is memorized in each functional unit; accordingly, the data stored in the clocking device and the memory device of each functional unit at the factory shipment of the vehicle can be surely reset to zero, even though each one of the functional units is provided with a clocking device and a memory device; further, thanks to the 0-reset prohibition flag incorporated each functional unit, additional 0-reset cannot be performed without the use of the external service tool; thus, the falsification of the data as to the cumulative operating time can be prevented.

Accordingly, the present invention provides a method for clocking cumulative operating time for a cargo-handling vehicle and the cargo-handling vehicle by use of the method, whereby the cumulative operating time is correctly and reliably conserved under a condition that the cumulative operating time is succeeded from a functional unit to a functional unit, in a case where:

(1) a functional unit incorporated with a clocking device becomes out of order and is replaced by new one;

(2) the functional unit incorporated with a clocking device is exchanged by an alternative functional unit so as to identify the cause of a malfunction and is returned back in-situ (to the original position of the functional unit); or, (3) the difference among the data regarding the cumulative operating time over the functional units is generated, within a predetermined level, the difference being generated by a power source shutdown prior to the memorization of the data in volatile memories as well as by the difference among the accuracies of the clocking devices over the functional units.

Further, the present invention can provide the method for clocking cumulative operating time for a cargo-handling vehicle and the cargo-handling vehicle by use of the method, whereby (4) the data regarding the cumulative operating time can be reset to zero at the factory shipment of the vehicle whereas the data is prevented from being falsified after the factory shipment.

BRIEF DESCRIPTION OF THE DRAWINGS

The present invention will now be described in greater detail with reference to the preferred embodiments of the invention and the accompanying drawings, wherein.

DETAILED DESCRIPTION OF THE PREFERRED EMBODIMENTS

Hereafter, the present invention will be described in detail with reference to the embodiments shown in the figures. However, the dimensions, materials, shape, the relative placement and so on of a component described in these embodiments shall not be construed as limiting the scope of the invention thereto, unless especially specific mention is made.

First Embodiment

Figure 1:
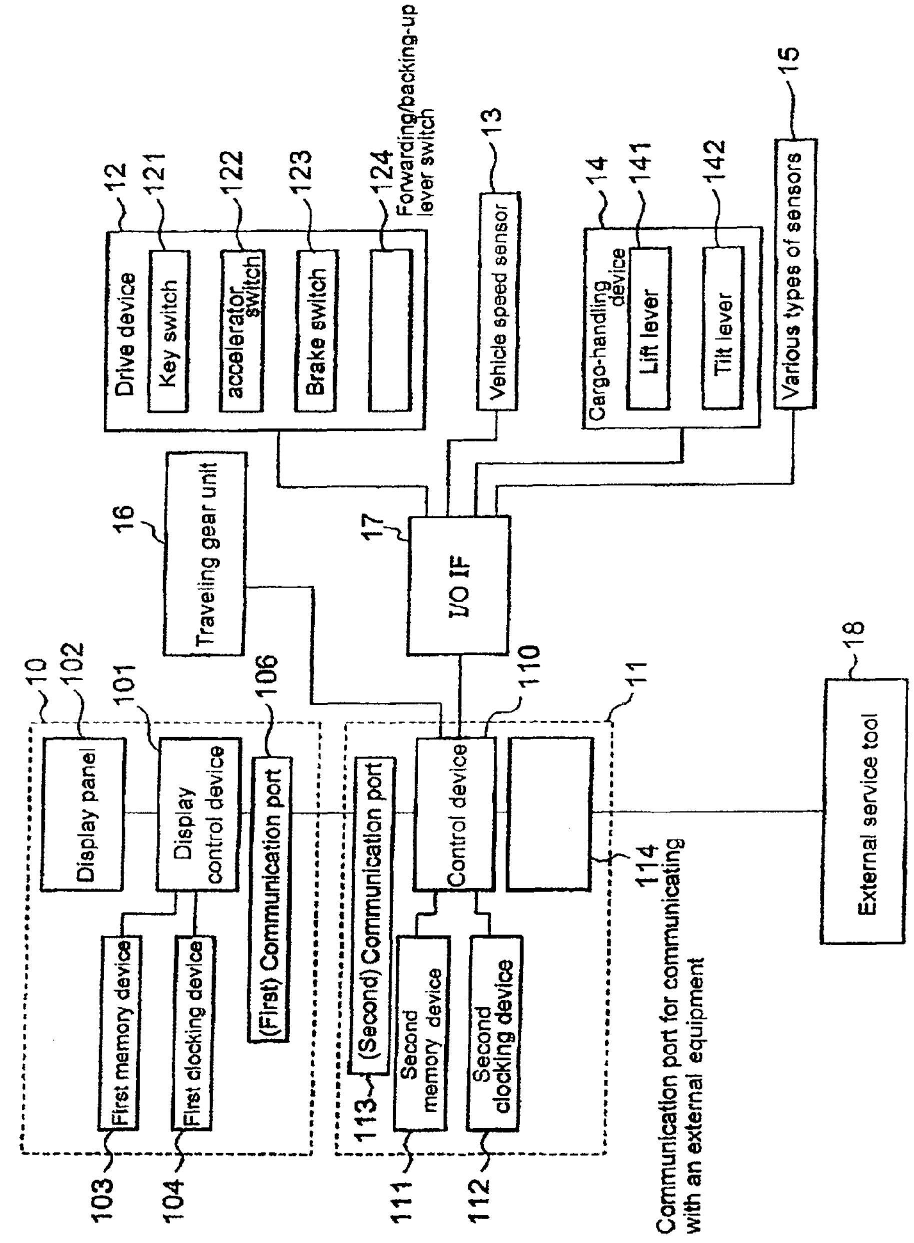
FIG. 1 shows a block diagram for the configuration as to the cargo-handling vehicle that applies the method for clocking cumulative operating time for a cargo-handling vehicle, according to the present invention.

FIG. 1 shows a block diagram for the configuration regarding a forklift as a cargo-handling vehicle that applies the method for clocking cumulative operating time for a cargo-handling vehicle, according to the present invention. In the first place, the cargo-handling vehicle to which the present invention applied is now explained in reference to the block diagram of FIG. 1. As already described, there are various types of cargo-handling vehicles such as a bulldozer and a crane truck besides a forklift; the present invention is applicable to each type of cargo-handling vehicles. In the following explanation, the reference is made to a vehicle provided with a control unit as a first functional unit for controlling the whole cargo-handling vehicle, and a display unit as a second functional unit for displaying the data such as the vehicle speed and the tilt angle, and each of the first and second functional units comprising a clocking device and a memory device. Naturally, a clocking device and a memory device may be provided in a functional unit other than the first and second units.

In FIG. 1, the numeral 10 denotes a display unit such as a liquid crystal display by use of liquid crystal; the display unit 10 receives signals from a control unit 11 that controls the whole cargo-handling vehicle as described later; the display unit displays various kinds of data (as to the signals) on a display panel 102. The data include a plurality of display items such as the speed of the vehicle, the engine speed, the tilt angle of the fork in a case where the cargo-handling vehicle is a forklift, the weight of the goods to be carried, the amount of the remaining fuel, the engine cooling water temperature, other error indications or caution labels (alarm displays) and so on; the data are selectively displayed on the display panel. Further, the display unit 10 includes a display control device 101 for performing the exchanges as to the data regarding the cumulative operating time, a first clocking device 104 for clocking the cumulative operating time of the vehicle, a first memory (device) 103 for storing the cumulative operating time which the first clocking device 104 clocked, a (first) communication port 106 for communicating with the control unit 11 by use of a communication control protocol named CAN (Controller Area Network) or a communication control protocol named Flex Ray.

The control unit 11 includes a CPU as well as a memory (a memory device), the unit 11 comprising a control device 110 for controlling the whole cargo-handling vehicle, a second clocking device 112 for clocking the cumulative operating time of the vehicle, a second memory (device) 111 for storing the cumulative operating time which the second clocking device 112 clocked, a (second) communication port 113 for communicating with the control unit 11 by use of a communication control protocol named CAN or Flex Ray, as is the case with the (first) communication port 106, and a (communicating) means 114 for communicating with an external equipment such as an external service tool 18 being used by a manufacturer side engineer, namely, a service engineer in performing maintenance work.

In addition, each of the first memory (device) 103 and the second memory (device) 111 is configured with volatile memory (RAM: Random Access Memory) and non-volatile memory (EPROM: Erasable and Programmable Read Only Memory); the data as to the cumulative operating time clocked by the first clocking device 104 and the second clocking device 112 are at first stored in (written to) the volatile memory of each memory (device); in the next place, the data are written to the non-volatile memory corresponding to the volatile memory after a predetermined time span has passed or when the power source for the cargo-handling vehicle is shutdown, so that the data are surely conserved. Further, in the non-volatile memory of the first memory (device) 103 or the second memory (device) 111, an internal flag is set so as to prohibit a second 0-rest after factory shipment of the vehicle; the prohibition flags are set at the time of the vehicle shipment when the data in the first memory (device) 103, the first clocking device 104, the second memory (device) 111, and the second clocking device 112 are reset to zero. Incidentally, the term "0-rest" is already defined and will be often used hereafter in this specification.

The numeral 12 denotes a drive device (a drive operation panel) comprising a key switch 121 for placing the power source of the vehicle under an ON-state or an OFF-state, an accelerator switch 122 for transmitting a signal (an accelerating signal) when the accelerator is stepped on, a brake switch 123 for transmitting a signal (a braking signal) when the brake pedal is stepped on, and a forwarding/backing-up lever switch 124 for transmitting a signal (a forwarding/backing-up signal) in shifting the forwarding/backing-up lever.

The numeral 13 denotes a vehicle speed sensor for detecting the travel speed of the cargo-handling vehicle; the numeral 14 denotes a cargo-handling device of a forklift, the cargo-handling device comprising a lift lever 141 for transmitting an order signal for lifting a cargo, and a tilt lever 142 for transmitting an order signal for inclining the fork forward or backward. The numeral 15 denotes a set of the sensors including a sensor for detecting the amount of the remaining fuel, a sensor for detecting the engine cooling water temperature and so on.

The numeral 16 denotes a traveling gear unit for driving the vehicle, the gear (unit) comprising an engine, a transmission, a brake and so on; the numeral 17 denotes an I/O (Input/Output) interface for transmitting the signals to the control unit 11 from the drive operation panel 12, the vehicle speed sensor 13, the cargo-handling device 14, and the set of the sensors 15; the numeral 18 denotes the external service tool for communicating with the control unit 11, the external service tool 18 being used by a manufacturer side engineer, namely, a service engineer who performs maintenance work.

In the cargo-handling vehicle as described thus far, the display panel 102 that configures the display unit 10 turns on a light when the key switch 121 is brought to an ON state (placed under a power-on condition); the data (signal) as to the cumulative operating time stored in the first memory (device) 103 is transferred toward the second memory (device) 111 in the control unit 11 via the (first) communication port 106 and the (second) communication port 113, while the data (signal) as to the cumulative operating time stored in the second memory (device) 111 is transferred toward the first memory (device) 103 in the display unit 10 via the (second) communication port 113 and the (first) communication port 106; in the display unit 10, the data value that has been stored therein is compared with the data value transferred from the control unit 11; and, if the two values are different, then the greater value is stored in the first memory (device); on the other hand, in the control unit 11, the data value that has been stored therein is compared with the data value transferred from the display unit 10; and, if the two values are different, then the greater value is stored in the second memory (device). Subsequently, the first clocking device 104 and the second clocking device 112 continue to clock the cumulative operating time independently of each other; the clocked cumulative operating time is reflected on each memory device while the key switch is placed an ON-state. Then, the data clocked by the first clocking device 104 is displayed on the display panel 102. Further, the display panel 102 displays the data transferred from the various sensors 15 via the I/O (Input/Output) interface 17, the control device 110, the (second) communication port 113, and the (first) communication port 106, whereby the transferred data are the fuel remaining amount, the engine cooling temperature, and the other state variables regarding the cargo handling vehicle.

In transporting a cargo, the tilt lever 142 of the cargo-handling vehicle 14 is pulled and the fork is lifted up to a level of 15 to 20 cm from a road surface; and, the accelerator is stepped on; thus, the traveling gear unit 16 is driven through the I/O (Input/Output) interface 17 as well as the control device 110. In this way, the cargo-handling vehicle travels to a place where a cargo exists, so as to face the cargo; thereby, the vehicle once stops by means of the brake 123, in front of the cargo at a distance of approximately 20 to 30 cm from the cargo; then, the fork is put under (or returned back to) a level condition, by operating the tilt lever 142; further, the height of the level plane is adjusted to a height of the pallet entry as to the cargo.

Under the just described condition, the cargo-handling vehicle steps forward by canceling the brake 123 and placing the forwarding/backing-up lever switch 124 at the forwarding position, under a condition that the pallet reaches the base of the fork; thus, the vehicle steps forward and stops, and the brake 123 is locked. In the next place, the cargo is lifted up by approximately 10 cm, by operating the lift lever 141; further, the fork is inclined over backward by pulling the tilt lever 142 so that the cargo loading condition can be stabilized; further, the cargo-handling vehicle steps backward to a place where the cargo can be safely unloaded, by canceling the brake 123 and placing the forwarding/backing-up lever switch 124 at a backing position.

When the vehicle steps back by 20 to 30 cm, the vehicle stops; the brake switch 123 is activated and the lift lever 141 is operated; subsequently, the lowermost bottom of the fork is lowered to a level of 15 to 20 cm from a road surface; then, the brake switch 123 is cancelled; the forwarding/backing-up lever switch 124 is placed at the backing position; and the vehicle is moved backward to a place where the vehicle can safely alter the traveling direction; and the vehicle goes to a next destination, for example, to a place where a truck to which the cargo is to be loaded is located or a place where a truck from which a cargo is to be unloaded is located.

Thus far, an explanation has been given regarding a block diagram for the configuration as to the cargo-handling vehicle that applies the method for clocking cumulative operating time for a cargo-handling vehicle, according to the present invention; and, the explanation has been given also regarding the movement of the cargo-handling vehicle. In the next place, the outline of the present invention is now explained. Incidentally, the following explanation is given on the premise the first functional unit is the control unit 11 for controlling the whole cargo-handling vehicle, and the second functional unit is the display unit 10 for displaying the various types of the data as to the vehicle. As a matter of course, the present invention is applicable to a case where the vehicle comprises other functional units and each of the other functional units is provided with a clocking device and a memory device. Further, it is noted that the control unit 11 or the display unit 10 is occasionally called the functional unit 11 or 10 in the following explanation.

In the present invention, each of the control unit 11 as the first functional unit for controlling the whole cargo-handling vehicle and the display unit 10 as the second functional unit for displaying the various types of the data as to the vehicle is provided with a clocking device for clocking the cumulative operating time regarding the vehicle and a memory device for storing the clocked data; thereby, the memory device comprises a volatile memory as well as a non-volatile memory. The data clocked by each clocking device is stored in the corresponding memory device; the data regarding cumulative operating time stored in the memory devices over multiple functional units are transmitted mutually from one to another, periodically with a constant frequency (or with predetermined periodicity). In each functional unit, the data regarding a cumulative operating time clocked in the functional unit is compared with the data that are transmitted from other functional units; if there are differences among the own data and received data, then all the data over the functional units are pasted (overwritten) by the greatest data (datam) regarding the cumulative operating time.

In the manner as described above, for instance, even in a case where the display unit 10 is configured as an assembly (part) and replaced by new one because of a malfunction of the display due to a light emitting diode failure, the (correct) cumulative operating time that has been stored in the other functional unit such as the control unit 11 for controlling the whole cargo-handling vehicle can be pasted on the clocking device as well as the memory device in the display unit 10; thus, the correct cumulative operating time can be clocked and conserved.

Further, besides the above case of the display unit replacement, even in a case where a failure occurs in the control unit 11 for controlling the whole cargo-handling vehicle and the control unit 11 is replaced by new one, the (correct) cumulative operating time that has been stored in the display unit 10 can be pasted on the clocking device as well as the memory device in the control unit 11. In this way, the correct cumulative operating time is surely clocked and conserved, even if the a functional unit other than the display unit 10 becomes out of order and replaced by new one.

However, if the synchronous data processing is applied indiscriminately to all the cases where there is a difference among the data regarding cumulative operating time over all the functional units, a problem occurs; the problem is as follows, as is already touched on.

In a case where a user owns a plurality of the cargo-handling vehicles, one of the vehicles sometimes goes out of order; thereby, the user or a service engineer temporarily replaces a functional unit (out of the disordered vehicle) such as the control unit 11 for controlling the whole cargo-handling vehicle or the display unit 10, by the corresponding functional unit out of one of the other cargo-handling vehicles that are normally operated, so as to identify (isolate) the cause of the trouble, namely, so as to confine the functional unit causing the trouble. And, when the cause of the trouble is clarified, the functional unit out of the normal vehicle as well as the functional unit out of the disordered vehicle is returned insitu. In response to this replacement work, the very problem under discussion happens; namely, according to every replacement work as described, the data regarding the cumulative operating time are renewed with the data storing the maximum cumulative operating time, over all the functional units; thus, the reliable conservation of the correct time becomes difficult.

Accordingly, in the present invention, a synchronous mode (a synchronization mode) is provided wherein a difference (if any) among the data regarding the cumulative operating time over the functional units is cancelled, the difference arising in a case where the cumulative operating time clocked in the control unit for controlling the whole cargo-handling vehicle differs from that clocked in another functional unit such as the display unit 10; in a similar fashion, a synchronization prohibition mode is provided wherein the difference cancellation is prohibited so that the cumulative operating time in a functional unit is continued to be clocked even when there is a difference among the functional unit and the other functional units. In continuing the cumulative operating time clocking as well as the clocked data storing, whether the synchronous mode is selected or the synchronization prohibition mode is selected depends on the magnitude of the difference between the cumulative operating time clocked in a functional unit and the cumulative operating time received by the functional unit through a communication means as well as depends on the magnitude of the cumulative operating time clocked and stored in a predetermined functional unit; further, which of the two modes is selected as an optimal mode depends on a case as described in the end part of "Background of the Invention: Cases (1) to (3)."

More concretely, for instance, the synchronous mode is selected when the maximum difference among the data regarding the cumulative operating time in the functional units is smaller than or equal to a predetermined value T, whereas the synchronization prohibition mode is selected when the maximum difference is greater than the value T. Incidentally, the predetermined value T may be a value corresponding to a time lag between a time point where the clocked cumulative operating time is stored in the non-volatile memory and a time point where the power source of the vehicle is shut down; the predetermined value T may be a value corresponding to the difference among the accuracies of the clocking devices over the functional units; or, the predetermined value T may be a value brought by a relatively trivial factor that does not cause a serious trouble. Thus, if the maximum difference among the data regarding the cumulative operating time in the functional units is smaller than or equal to a predetermined value T, then it is judged that each functional unit is free from a serious trouble suspending the functions of the functional unit. In addition, it is considered in view of cumulative operating time control that the greatest value among the data regarding the cumulative operating time over all the functional units is the most reliable value; therefore the greatest value is pasted on the data of smaller cumulative operating time in the other functional units. Accordingly, in the synchronous mode, the most reliable data regarding the cumulative operating time in a functional unit, as a proper value, can be automatically pasted on the data regarding the cumulative operating time in the other functional units, in a case where the difference among the data regarding the cumulative operating time over the functional units is generated by a factor that is unrelated to a serious trouble.

On the other hand, it is considered that the synchronization prohibition mode is related to the cases of serious potential troubles. As described in the end part of "Background of the Invention," the cases are:

(Case 1 where) a functional unit incorporated with a clocking device becomes out of order and is replaced by new one; and (Case 2 where) the functional unit incorporated with a clocking device is exchanged by an alternative functional unit so as to identify the cause of a malfunction and is returned back in-situ (to the original position of the functional unit).

In the above Case 1, even if a synchronous mode is adopted, there happens no problem; however, in Case 2, if a synchronous mode is adopted, a problem may happen whereby the cumulative operating time of a younger cargo-handling vehicle increases (a younger vehicle becomes older than proper age) or the cumulative operating time of an elder (more used) cargo-handling vehicle decreases (a elder vehicle becomes younger than proper age). Nevertheless, it is difficult to distinguish Case 1 from Case 2, simply on a reason that the time difference exceeds the value T; accordingly, when the time difference is greater than T, the synchronization prohibition mode may be adopted first of all; and, when a service engineer is involved a troubleshooting so as to determine how to solve the malfunction, a possible problem due to a careless synchronous mode adoption can be evaded; and, the proper cumulative operating time, or the reliability regarding the cumulative operating time can be conserved.

Moreover, an alarm may be issued so as to help the service engineer treat with the trouble under the synchronization prohibition mode. Thus, the service engineer can judge the situation; further, he or she can returns back the functional units exchanged for the purpose of identifying the cause of the trouble to the original positions as to the (exchanged) functional units, with and without the synchronous mode in response to Case 1 and Case 2 respectively. Thereby, the increase, if any, of the cumulative operating time during that situation (during the troubleshooting) is infinitesimal, and the time difference among the data regarding the cumulative operating time is eliminated by the synchronous mode; thus, a method for clocking cumulative operating time for a cargo-handling vehicle and the cargo-handling vehicle by use of the method can be provided, thereby the proper cumulative operating time, or the reliability regarding the cumulative operating time can be conserved, the cumulative operating time being succeeded in the vehicle.

In addition, in an embodiment in relation to Case 1 according to the present invention, an alarm is issued so as to help the service engineer or the user treat with the trouble; and, any one of the functional units can eliminate the time difference among the data regarding the cumulative operating time over the functional units even by canceling the synchronous prohibition mode, based on the order of the cancellation as to the mode, from the external service tool; in this way, a method for clocking cumulative operating time for a cargo-handling vehicle and the cargo-handling vehicle by use of the method can be provided, thereby the proper cumulative operating time, or the reliability regarding the cumulative operating time can be always conserved, the cumulative operating time being succeeded in the vehicle.

Further, in another embodiment according to the present invention, besides the above described synchronization prohibition mode with an alarm message (to help the service engineer or the user treat with the trouble), a synchronous prohibition mode without an alarm message can be provided. This embodiment is considered (contrived) for some users who do not prefer the automatic pasting of the data regarding the greatest cumulative operating time, the users possessing the cargo-handling vehicles that have not been used as if the vehicles were new-vehicles; incidentally, the synchronous prohibition mode without an alarm message is a process mode in which the activation of the synchronous mode is limited until the cumulative operating time stored in a functional unit that is previously selected exceeds a predetermined time t.

Accordingly, besides the difference threshold T as to the maximum difference among the data regarding the cumulative time over the functional units, a threshold (a time factor) t is incorporated in the selection condition in connection to the synchronous mode and the synchronization prohibition mode; for instance, the threshold (time factor) t may be set at such a level that a used cargo-handling vehicle is regarded as a new-vehicle if the cumulative operating time of the used cargo-handling vehicle is within the level. In this way, the synchronization prohibition mode without an alarm message is realized whereby neither emergency (repair) measure nor synchronization among the data regarding the cumulative operating time is needed, under a condition that the maximum difference among the data over the functional units is smaller than the threshold T as well as the cumulative operating time of the vehicle is less than the threshold t. Thus, the method and the vehicle according the present invention can deal with the needs of users.

Further, in the cargo-handling vehicle according to the present invention, in response to a request as to the cumulative time reset from the external service tool, the data regarding the cumulative time over the functional units are reset to zero, and the 0-reset prohibition flag is memorized in each functional unit; accordingly, the data stored in the clocking device and the memory device of each functional unit at the factory shipment of the vehicle can be surely reset to zero, even though each one of the functional units is provided with a clocking device and a memory device; further, thanks to the 0-reset prohibition flag incorporated (established) in each functional unit, additional (repeated) 0-reset cannot be performed without the use of the external service tool; thus, the falsification of the data as to the cumulative operating time can be prevented.

Accordingly, the present invention provides a method for clocking cumulative operating time for a cargo-handling vehicle and the cargo-handling vehicle by use of the method, whereby the cumulative operating time is correctly and reliably conserved under a condition that the cumulative operating time is succeeded from a functional unit to a functional unit, in a case where:

(1) a functional unit incorporated with a clocking device becomes out of order and is replaced by new one;

(2) the functional unit incorporated with a clocking device is exchanged by an alternative functional unit so as to identify the cause of a malfunction and is returned back in-situ (to the original position of the functional unit); or, (3) the difference among the data regarding the cumulative operating time over the functional units is generated, within a predetermined level, the difference being generated by a power source shutdown prior to the memorization of the data in volatile memories as well as by the difference among the accuracies of the clocking devices over the functional units.

In this way, there arises no apprehension that the reliability as to the cumulative operating time of the cargo-handling vehicle is impaired.

Further, the present invention can provide the method for clocking cumulative operating time for a cargo-handling vehicle and the cargo-handling vehicle by use of the method, whereby (4) the data regarding the cumulative operating time can be reset to zero at the factory shipment of the vehicle as well as the data is prevented from being falsified after the factory shipment.

Figure 2:
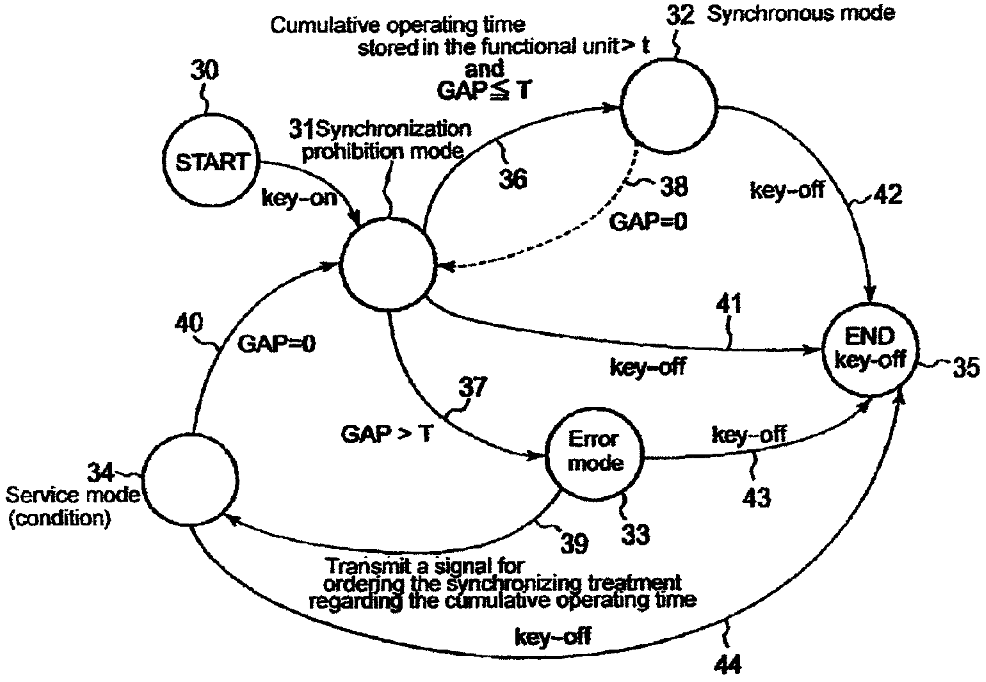
FIG. 2 shows a state (mode) transition diagram as to the method for clocking cumulative operating time for a cargo-handling vehicle, according to the present invention.

In the next place, a further detailed explanation is now be given in consultation with FIG. 2 that shows a state transition diagram as to the transitions between the synchronous mode and the synchronization prohibition mode in relation to the method for clocking cumulative operating time for a cargo-handling vehicle according to the present invention. FIG. 2 is depicted on an implicit premise that the functional unit is a vehicle control module (VCM or Vehicle Control Module) such as the control unit 11 shown in FIG. 1; GAP in FIG. 2 denotes the difference between the cumulative operating time in the clocking devices provided in the control device 11 and the cumulative operating time in the clocking devices provided in the display unit 10. Further, the mark with the numeral 31 denotes a synchronization prohibition mode; the mark with the numeral 32 denotes a synchronous mode; an error mode 33 means a synchronization prohibition mode that issues an alarm message (an alarm indication); a service mode (a service state) 34 means a mode following the service mode 33 thereby the service mode 34 performs the same kind of data processes as the synchronous mode in which the difference as to the cumulative operating time between the functional units is eliminated; and, the service mode (a service state) 34 is a state before each of the functional units is returned to a normal state (a normal operating condition). As is described, the transition diagram of FIG. 2 is depicted on a premise that the functional unit of FIG. 2 is the control unit 11 for controlling the whole cargo-handling vehicle; thereby, the time differences between the functional units are computed through the data communication between the clocking devices over the functional units so as to select the optimal mode to be applied in response to each case where the to-be adopted mode is applied. In a case where the FIG. 2 is depicted on the basis of the display unit 10, the situation is the same; namely, the optimal mode is selected in a similar way (i.e. through the data communication (exchange) and the difference computation as explained).

At first, in FIG. 2, a key switch for starting or stopping the engine of the cargo-handling vehicle is placed under an ON-state at a location 30 with an expression "START"; then, the functional units in discussion (including the control unit in FIG. 2) are firstly placed under the synchronization prohibition mode 31, so as to deal with the following various cases (as already touched on) where the difference between the data regarding the cumulative operating time over the functional units is generated:

(Case 1) a functional unit incorporated with a clocking device becomes out of order and is replaced by new one;

(Case 2) the functional unit incorporated with a clocking device is exchanged by an alternative functional unit so as to identify the cause of a malfunction and is returned back in-situ (to the original position of the functional unit); or, (Case 3) the difference among the data regarding the cumulative operating time over the functional units is generated, within a predetermined level, the difference being generated by a power source shutdown prior to the memorization of the data in volatile memories as well as by the difference among the accuracies of the clocking devices over the functional units.

In response to various cases including the above cases, at first, the synchronization prohibition mode 31 is set so that the time differences are not cancelled until the proper cumulative operating time is identified. In addition, on the premise that the proper cumulative operating time is already correctly conserved, the to-be selected mode may be determined after the time differences among the proper cumulative operating time and the other cumulative operating time(s) in the clocking devices provided in the functional units such as the control unit 11 and the display 10 are computed, namely, after the time differences are recognized so as to be able to determine the to-be selected mode.

In the synchronization prohibition mode 31, a value "0" as a cumulative operating time is transmitted from a functional unit such as the control unit 11 for controlling the whole cargo-handling vehicle or the display unit 10 for displaying the various data of the vehicle, toward the other functional units; on the side of a functional unit receiving the value "0," the value "0" is compared with the cumulative operating time on the functional unit receiving the value "0"; thereby, since the value "0" is the non-negative least value, the received value (data) is not pasted in each functional unit (since the figure on the receiving side is considered to be greater than "0").

The synchronization prohibition mode 31 is applied to, for instance, a case where the cumulative operating time difference between the data in the clocking devices provided in the control unit 11 and the display unit 10 is 0 as well as a case where the cumulative operating time in a predetermined functional unit is less than the predetermined time t, the time t being a maximum time until which the cargo-handling vehicle concerned is regarded as a new-vehicle (, if the age of the vehicle is younger than the age t). Concretely, the time t is a level of several tens of hours. Naturally, the level of several tens of hours is quoted as only an example and the time t is not limited to this level.

Further, in order to form the synchronization prohibition mode, besides the manner by use of the transmission and reception of the value "0," the transmission itself from a functional unit to another functional unit may be shut down.

Under the synchronization prohibition mode, there are, for instance, two conditions:

a condition where the cumulative operating time in a functional unit such as the control unit 11 for controlling the whole cargo-handling vehicle exceeds the time t; and, a condition where the time difference T between the data regarding the cumulative operating time in the clocking devices of the control unit 11 and the display unit 10, the time difference T being supposed to be relatively little (e.g. less than several hours).

In a case where these two conditions hold, it is considered that the time difference T of less than the relatively little value is generated by a power source shutdown prior to the memorization of the data in volatile memories as well by as the difference among the accuracies of the clocking devices over the control unit 11 and the display unit 10; thereby, the synchronization prohibition mode 31 is shifted to a synchronous mode 32 along a curved arrow 36 as shown in FIG. 2.

Under the synchronous mode 32, in each functional unit, the cumulative operating time is renewed with a maximum cumulative operating time over the whole functional units; thus, the mutual time differences among the data regarding the cumulative operating time over the functional units become zero, namely, the before-mentioned GAP becomes zero. With this condition of GAP=0, the synchronous mode 32 is shifted to (returned back to) the synchronization prohibition mode 31 whereby data paste is no more performed. However, no problem will happen, even if the synchronous mode 32 may be kept without being shifted to the mode 31.

On the other hand, under the synchronization prohibition mode 31, there should be considered (be taken into consideration) a case whereby the difference GAP exceeds the predetermined time difference T; for instance, there may be a case whereby the mutual time difference between the data regarding the cumulative operating time in the clocking devices of the control unit 11 and the display unit 10 exceeds the predetermined time difference T. It is considered that this very case is caused by a malfunction of a functional unit such as either of the control unit 11 or the display unit 10 thereby the functional unit is replaced by an alternative one for the purpose of investigating the cause of the malfunction; or this very case is caused by a failure of a configuration member such as the clocking device. When this very case happens, the synchronization prohibition mode 31 is shifted to an error mode 33 through a dotted curve route 36 as shown in FIG. 2; under the error mode 33, the display unit 10 can issue an alarm message as to the error or the malfunction by an alarm means such as a screen, a buzzer or a voice, thereby the vehicle can be under operation even while the functional unit is replaced by an alternative functional unit; naturally, the error message may be issued from a functional unit other than the display unit.

Under the error mode 33, when the cause of the error is identified and the malfunction functional unit is exchanged by an alternative unit, the cargo handling vehicle is connected to the external service tool 18 shown in FIG. 1; an signal for ordering the synchronizing treatment (i.e. for requiring the elimination) regarding the cumulative operating time differences among the functional units is transmitted from the external service tool 18 toward the control device 110 in the control device 11, via the (communicating) means 114; the error mode 33 is shifted to a service mode (a service state or condition) 34 along an arrow curve 39 as shown in FIG. 2. Under the service mode 34 following the error mode 33, the synchronization prohibition mode is cancelled; and, the mutual transmission of the "0" signal among the functional units is cancelled so that the functional units are placed under a synchronous mode as are the synchronous mode 32; thus, under the service mode 34, the maximum data regarding the cumulative time over the functional units other than the replaced functional unit is pasted throughout all the functional units so that the regular (normal) state is restored as to the cargo-handling vehicle and the functional units thereof. It is noted, though trivial, that the error alarm continues to be issued until the synchronization process is completed.

In the manner as described above, a service engineer always intervenes in the replacement as to a malfunction functional unit; thus, a desirable (service) control of the cargo-handling vehicle is performed. Incidentally, what the service engineer can perform is limited only to the cancellation of the error mode, as well as, the approval and/or execution as to the synchronization process (regarding the cumulative operating time); thus, even the service engineer cannot perform an arbitrary data input. Hence, more reliable clocking and storing as to the cumulative operating time of the vehicle can be performed.

In addition, when the key switch for starting (or stopping) the engine of the cargo-handling vehicle is placed under an OFF-state in each of the synchronization prohibition mode 31, the synchronous mode 32, the error mode 33 and the service mode (the service state or condition) 34, each mode is shifted to an end mode 35 where a series of processes finishes.

Figure 3:
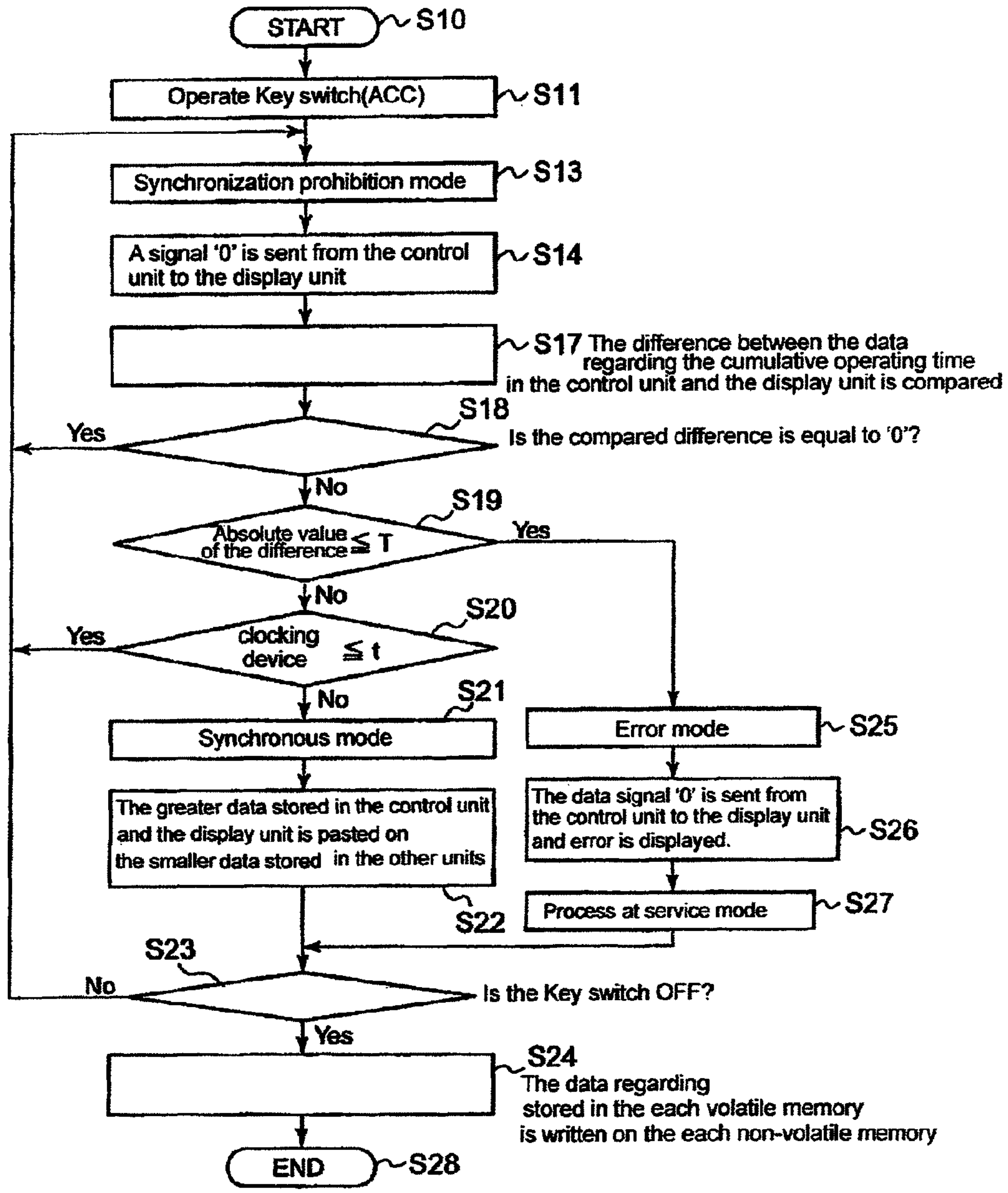
FIG. 3 shows a flow diagram as to the method for clocking the cumulative operating time of the cargo-handling vehicle, according to the present invention.
Figure 4:
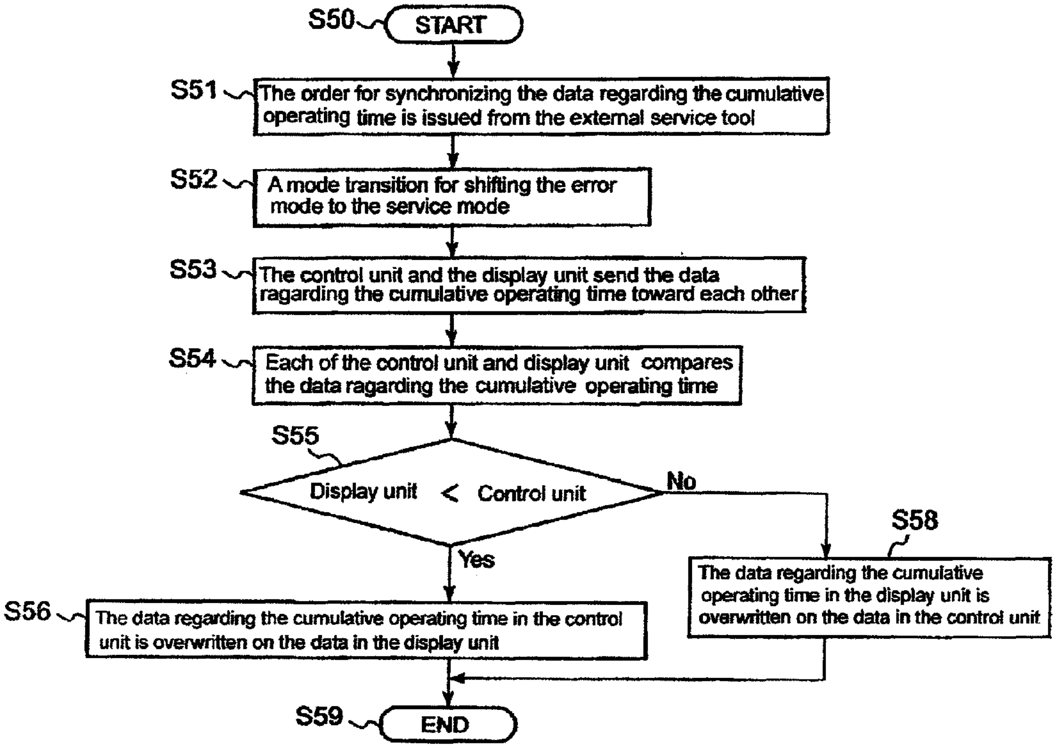
FIG. 4 shows a flow diagram as to the process flow in a case where the external service tool issues a synchronizing order regarding the cumulative operating time, toward the control unit.

In the next place, the present invention is now be explained further in detail, by use of FIG. 3 that shows a flow diagram as to the method for clocking the cumulative operating time of the cargo-handling vehicle, according to the present invention, as well as, by use of FIG. 4 that shows a flow diagram as to the process flow in a case where the external service tool issues a synchronizing order regarding the cumulative operating time, toward the control unit. Incidentally, the flow diagrams in FIGS. 3 and 4 are explained on the premise that the functional unit thereof is basically the control unit 11 for controlling the whole cargo-handling vehicle, as is the case with the a state (mode) transition diagram in FIG. 2; however, the subject functional unit may be another functional unit such as the display unit 10. Whether the subject functional unit may be the display unit or another functional unit so long as the data regarding the cumulative operating time are transmitted among the functional units; and, the time differences regarding the cumulative operating time are computed in the functional units. Based on the time differences, the optimal mode is determined (selected), out of the modes 31 to 35.

At first, the series of the steps in the flow diagram of FIG. 3 starts at the step S10; in the next step S11, the key switch 121 is placed under an ON-state; then, the display panel 102 configuring the display unit 10 lights up. In the following step S13, the synchronous mode is shifted to synchronization prohibition mode; namely, the synchronization prohibition mode 31 is established as depicted in FIG. 2; then, in the step S14 next to the step S13, a signal (a data) "0" is sent from the control unit 11 to the display unit 10; in the display unit 10, the received data "0" is compared with the data that has been stored in the display unit 10. Since the received data is zero, the received data is not pasted on the data that has been stored in the first memory device in the display unit 10; in other words, the synchronization prohibition process is performed.

In the step S17 following the step S14, the difference between the data regarding the cumulative operating time in the control unit 11 and the display unit 10 is compared (computed). More concretely, this comparison process is performed in a manner that the display control device 101 in the display unit 10 always retrieves the cumulative operating time in the first clocking device 104; the retrieved data is transferred to the control device 110 in the control unit 11, through the communication port 106 in the display unit 10 and the communication port 113 in the control unit 113; in the same way, the control device 110 in the control unit 11 always retrieves the cumulative operating time in the second clocking device 112; the retrieved data is transferred to the display control device 101 in the display unit 10, through communication port 113 in the control unit 113 and the communication port 106 in the display unit 10.

In the step S18 following the step S17, it is firstly judged whether or not the compared difference is equal to "0." When the judgment is affirmative, the step S18 is returned back to the step S13 and the synchronization prohibition mode is continued; when the judgment is negative, the step S18 is followed by the step S19. In the step S19, it is further judged whether or not the difference between the data regarding the cumulative operating time in the control unit 11 and the display unit exceeds the time T, namely, it is judged whether the synchronous mode may be established even under the synchronization prohibition mode 31; hereby, the time difference T may be regarded as an allowable maximum difference value (threshold) in response to the case where the difference among the data regarding the cumulative operating time over the functional units is generated, within a predetermined level, the difference being generated by (a relatively slight cause such as) a power source shutdown prior to the memorization of the data in volatile memories as well as the difference among the accuracies of the clocking devices over the functional units. In the judgment in the step S19, when the time difference exceeds the predetermined value T, the step S19 is followed by the step S25 in which the error mode 33 is established as shown in FIG. 2; when the time difference less than or equal to the value T, the step S19 is followed by the step S20 as is explained in the following paragraph.

In the step S20, it is further judged whether or not the time difference that is recognized in this stage (step) is greater than the time value t; hereby, the time t is related to the case where the cargo-handling vehicle is regarded as a new-vehicle, even though the cumulative operating time after the factory shipment of the vehicle exceeds zero, and if the cumulative operating time is less than the time value t. If the cumulative operating time is less than or equal to the time t, the step S20 is returned back to the step S13 (the synchronization prohibition mode 31 is continued), and the processes described thus far are repeated; when the time difference exceeds the time value t, the step S20 is followed by the step S21. In the step S21, the synchronization prohibition mode is shifted to the synchronous mode 32 as shown in FIG. 2. In this synchronous mode 32, when there is a difference between the data regarding the cumulative operating time in the functional units, the greater data stored in the functional unit is pasted on the smaller data stored in the other functional unit (e.g. the first memory device 103 or the second memory device 111) as already explained. Thus, the step S22 is followed by the step S23 that is explained later.

On the other hand, in the step S19, when the time difference (the absolute value) is greater than the value T, the step S19 is followed by the step S25 where the synchronization prohibition mode is shifted to the error mode 33 as shown in FIG. 2. The step S25 is followed by the step S26; thereby, the data signal "0" is sent from the control unit 11 to the display unit 10 so that the paste of the data regarding the cumulative operating time is prohibited, as already explained; further, even in a case where either of the control unit 11 or the display unit 10 is replaced by an alternative unit for the purpose of investigating the cause of a malfunction, an order to inform of the error (mode) is issued to the display control device 101 so that the display unit 10 displays the error message while the cargo-handling vehicle is allowed to be operated. Thus, the display control device 101 makes the display panel 102 inform of the error message toward the outside by means of a (display) screen, a buzzer or a loud voice.

On the other hand, in a case where a functional unit, for instance, either of the control unit 11 or the display unit 10 is replaced by an alternative one because of the malfunction occurring on the functional unit, the external service tool 18 is connected to the cargo-handling vehicle in the step S27 so that the error mode is shifted to the service mode 34 in a manner that an order for synchronizing the data regarding the cumulative operating time over the functional units (the control unit 11 and the display unit 10) is issued, from the external service tool 18 toward the control device 110, through the communication port 114; and, the greater cumulative operating time in the first memory device 103 or the second memory device 111 is shared with both the device, as is the case under the synchronous mode 32.

When the processes in the step S27 finish, the step S27 is followed by the step S23 whereby it is judged whether or not the key switch is placed under an OFF-state. If the key is not placed under an OFF-state, the step S23 is returned back to the step S13 and a series of processes described thus far is repeated; if the key is placed under an OFF-state, the step S23 is followed by the step S24 whereby the data regarding the cumulative operating time stored in the each volatile memory in the functional unit corresponding to the volatile memory is written on the each non-volatile memory corresponding to the volatile memory. Thus, at the step S 28, a series of processes ends. Incidentally, it is noted that the data stored in each volatile memory is periodically conserved in the corresponding non-volatile memory that is included in the corresponding memory device, independently of the process flow that is shown here.

FIG. 4 shows a flow diagram as to the process flow in a case where the external service tool 18 (cf. FIG. 1) issues a synchronizing order regarding the cumulative operating time, toward the control unit; more concretely, the flow diagram in FIG. 4 is a detailed flow diagram corresponding to the step S27 in FIG. 3. The order for synchronizing the data regarding the cumulative operating time over the functional units is issued from the external service tool 18, in the step S51; then, in the following step S52, a mode transition order for shifting the error mode 33 to the service mode (state) 34 is issued from the control unit 11. Further, in the following step S53, the control unit 11 and the display unit 10 send the data regarding the cumulative operating time toward each other.

In the following step S54, each of the control unit 11 and the display unit 10 compares the data regarding the cumulative operating time sent from the other unit with the data clocked by the own unit as well as stored in the own unit; further, in the following step S55, it is judged whether or not the cumulative operating time stored in the control unit 11 is greater than the cumulative operating time clocked by the display unit 10. If the judgment result is affirmative, then the step S55 is followed by the step S56 whereby the data regarding the cumulative operating time in the control unit 11 is overwritten on the data regarding the cumulative operating time in the display unit 10; If the judgment result is negative, then the step S55 is followed by the step S58 whereby the data regarding the cumulative operating time in the display unit 10 overwritten on the data regarding the cumulative operating time in the control unit 11. Thus, a series of the detailed processes in the step S27 in FIG. 3 ends.

According to the present invention described thus far, the method for clocking cumulative operating time for a cargo-handling vehicle and the cargo-handling vehicle by use of the method can be provided, whereby the cumulative operating time is correctly and reliably conserved under a condition that the cumulative operating time is succeeded from a functional unit to a functional unit, in a case where:

(1) a functional unit incorporated with a clocking device becomes out of order and is replaced by new one;

(2) the functional unit incorporated with a clocking device is exchanged by an alternative functional unit so as to identify the cause of a malfunction and is returned back in-situ (to the original position of the functional unit); or, (3) the difference among the data regarding the cumulative operating time over the functional units is generated, within a predetermined level, the difference being generated by a power source shutdown prior to the memorization of the data in volatile memories as well as by the difference among the accuracies of the clocking devices over the functional units.

There is, however, a potential difficulty to be overcome by the present invention; the difficulty relates to the introduction of a duplex system (a redundant system) as to the clocking devices (i.e. the first clocking device and the second clocking device) as well as the memory devices (i.e. the first memory device 103 and the second memory device 111). In a case like this, it is required that all the data regarding the cumulative operating time over the clocking devices and the memory devices be accurately reset to zero; if the data of non zero value regarding the cumulative operating time is left in any one of the clocking devices and the memory devices at the factory shipment of the vehicle, then the non-zero data hinders an accurate data succession from a functional unit to a functional unit in the vehicle, as there arises a problem that the relatively greater data (non zero data) is overwritten on the memory data in which the zero value has been already placed, for instance, according to the rule of the flow diagram of FIG. 3, after the vehicle is handed over to the owner.

Figure 5:
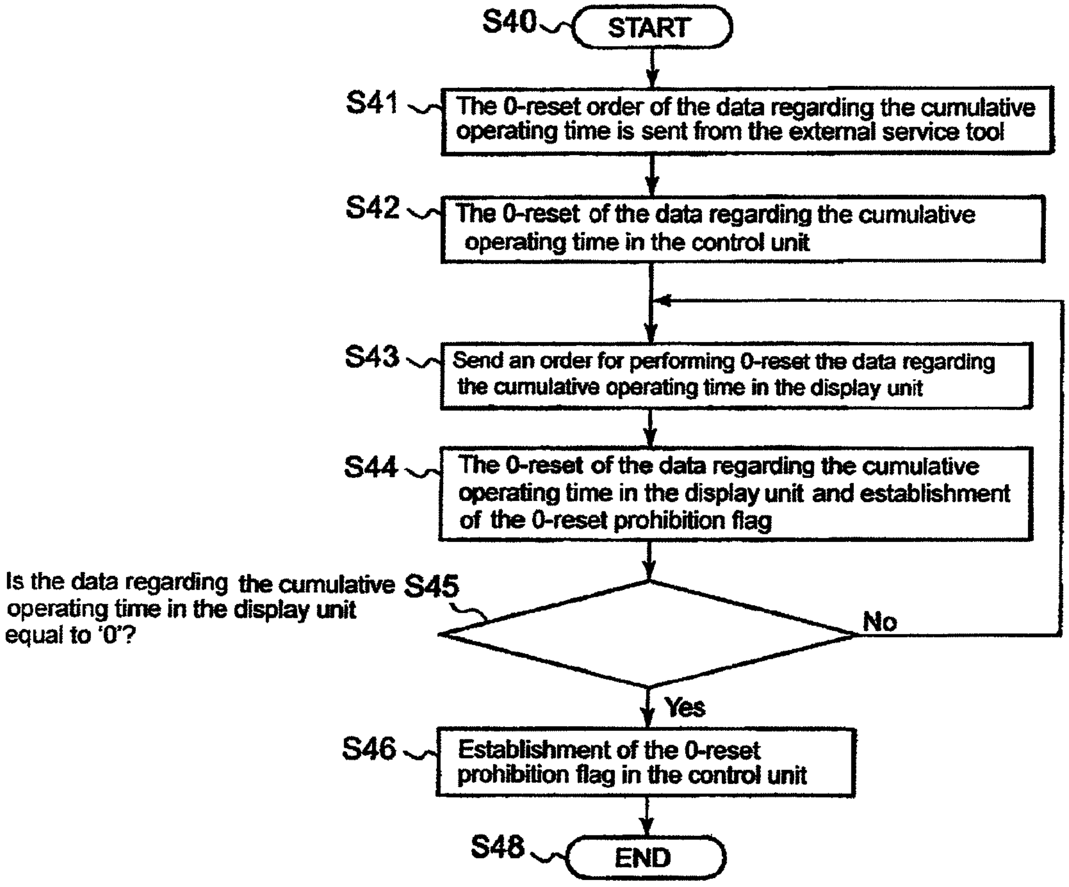
FIG. 5 shows a flow diagram as to the process flow in a case where the 0-reset is performed at the factory delivery of the cargo-handling vehicle, according to the present invention.

In order to overcome the above-described difficulty, FIG. 5 shows a detailed flow diagram as to the 0-reset regarding the cumulative operating time in each clocking device of the functional units of the cargo-handling vehicle according to the present invention, in a case of the factory shipment (or a service work completion). As per the flow diagram (i.e. a routine) of FIG. 5, the 0-reset is surely and correctly performed at the factory shipment of the vehicle; the data regarding the cumulative operating time in the first memory device 103 and the second memory device 111 as well as the first clocking device 104 and the second clocking device 112 are properly reset to zero, as per the 0-reset order for resetting the data regarding the cumulative operating time in the first memory device 103 and the second memory device 111 as well as the first clocking device 104 and the second clocking device 112, the order being issued from the external service tool 18 (shown in FIG. 1) or other equivalent device, through the communication port 114, when the cargo-handling vehicle is shipped from the factory.

In FIG. 5, a series of processes starts from the step S40; in the following step S41, the 0-reset order is sent from the external service tool 18 (shown in FIG. 1) to the control device 110 in the control unit 11 through the communication port 114; in the following step S42, the control device 110 resets the data regarding the cumulative operating time in the second memory device 111 and the second clocking device 112 to zero; in the following step S43, the control device 110 sends an order for resetting (performing 0-resetting) the data regarding the cumulative operating time in the display unit 10, as well as, for establishing the 0-reset prohibition flag in the display unit 10, toward the display unit 101, through the communication ports 113 and 106.

Accordingly, in the following step S44, the display control device 101 resets the data in the first clocking device 104 and the first memory device 103 to zero, and establishes the 0-reset prohibition flag in the first memory device 103, thereby the information as to the completion of the 0-reset process as well as the 0-reset prohibition flag establishment is sent back to the control unit 110 through the communication ports 106 and 113. In the following step S45, in response to the sent-back information, the control device 110 confirms the completion of the 0-reset process as well as the establishment of the 0-reset prohibition flag; thereby, if the 0-reset process is not completed or the 0-reset prohibition flag establishment is not completed, then the step S45 is returned back to the step S43. When the process is returned back to the step S43, the control device 110 repeatedly sends an order for resetting the data regarding the cumulative operating time in the first clocking device 104 and the first memory device 103 in the display unit 10, as well as, for establishing the 0-reset prohibition flag in the display unit 10, toward the display unit 101, through the communication ports 113 and 106.

On the contrary, when the control unit confirms that the 0-reset process and the 0-reset prohibition flag establishment are completed, the step S45 is followed by the step S46 whereby the 0-reset prohibition flag is established in the second memory device 111 in the control unit 11; thus, the series of processes ends in the following step S48.

INDUSTRIAL APPLICABILITY

The cargo-handling vehicle according to the present invention can always conserve the proper cumulative operating time of the vehicle; the proper cumulative operating time can continually conserved in the vehicle, even through various situations or events like a case where the display unit equipped with a clocking device becomes out of order and replaced by an alternative unit; further, the present invention can be applicable to a case where the clocking device is surely reset to zero at the factory shipment of the vehicle, so as to prevent a potential problem in relation to the cumulative operating time after the shipment of the vehicle.

The invention claimed is:

1. A method for clocking cumulative operating time for a cargo-handling vehicle provided with a plurality of functional units, the functional units comprising at least a first functional unit and a second functional unit; whereby, each of the first functional unit having a first clocking device and the second functional unit having a second clocking device clocks the cumulative operating time of the cargo-handling vehicle, by use of each clocking device;

the data information regarding the clocked cumulative operating time is stored in a memory device provided in each functional unit;

the data information regarding cumulative operating time stored in each functional unit transmitted toward the other functional units, and the data regarding cumulative operating time over all the functional units are mutually transmitted one another, through a communication port provided in each functional unit for sending and receiving the data information;

the differences among the data regarding the cumulative operating time over all the functional units are estimated so that the greatest cumulative operating time and the unit corresponding to the greatest cumulative operating time over all the functional units are identified;

each of the functional units selects either of a synchronous mode under which the data regarding the greatest cumulative operating time stored in the functional unit corresponding to the greatest cumulative operating time is overwritten on the data regarding cumulative operating time stored in the remaining functional units so that all the differences among the data regarding cumulative operating time over all the functional units are cancelled, or a synchronization prohibition mode under which the process execution under the synchronous mode is prohibited; thereby the data regarding the cumulative operating time clocked and stored in each functional unit is reset to zero as per the 0-reset order from an external service tool, and a 0-reset prohibition flag is established in each functional unit.

2. A cargo-handling vehicle provided with a plurality of functional units, the functional units comprising at least a first functional unit and a second functional unit; whereby, each of the first functional unit having a first clocking device and the second functional unit having a second clocking device clocks the cumulative operating time of the cargo-handling vehicle, by use of each clocking device;

each functional unit is provided with a memory device for storing the data regarding the cumulative operating time clocked in the functional unit;

each functional unit is provided with a communication port for sending and receiving the data regarding cumulative operating time stored in the functional unit; the data regarding cumulative operating time over all the functional units being mutually transmitted one another through the communication ports;

the differences among the data regarding the cumulative operating time over all the functional units are estimated so that the greatest cumulative operating time and the unit corresponding to the greatest cumulative operating time over all the functional units are identified;

each of the functional units selects either of a synchronous mode under which the data regarding the greatest cumulative operating time stored in the functional unit corresponding to the greatest cumulative operating time is overwritten on the data regarding cumulative operating time stored in the remaining functional units so that all the differences among the data regarding cumulative operating time over all the functional units are cancelled, or a synchronization prohibition mode under which the process execution under the synchronous mode is prohibited; thereby, by use of a control device provided in each functional unit, each functional unit is placed under the synchronous mode in a case where the maximum value among the data regarding the cumulative operating time over all the functional units is less than or equal to a predetermined T, whereas each functional unit is placed under the synchronization prohibition mode in a case where the maximum value is greater than the predetermined time T, whereby, each of the first functional unit having a first clocking device and the second functional unit having a second clocking device clocks the cumulative operating time of the cargo-handling vehicle, by use of each clocking device;

each functional unit is provided with a memory device for storing the data regarding the cumulative operating time clocked in the functional unit;

each functional unit is provided with a communication port for sending and receiving the data regarding cumulative operating time stored in the functional unit; the data regarding cumulative operating time over all the functional units being mutually transmitted one another through the communication ports;

the differences among the data regarding the cumulative operating time over all the functional units are estimated so that the greatest cumulative operating time and the unit corresponding to the greatest cumulative operating time over all the functional units are identified; by use of a control device provided in each functional unit, each of the functional units selects either of a synchronous mode under which the data regarding the greatest cumulative operating time stored in the functional unit corresponding to the greatest cumulative operating time is overwritten on the data regarding cumulative operating time stored in the remaining functional units so that all the differences among the data regarding cumulative operating time over all the functional units are cancelled, or a synchronization prohibition mode under which the process execution under the synchronous mode is prohibited; thereby, by use of a control device provided in each functional unit, the data regarding the cumulative operating time clocked and stored in each functional unit is reset to zero as per the 0-reset order from an external service tool, and a 0-reset prohibition flag is established in each functional unit.

* * * * *